Figure 1:
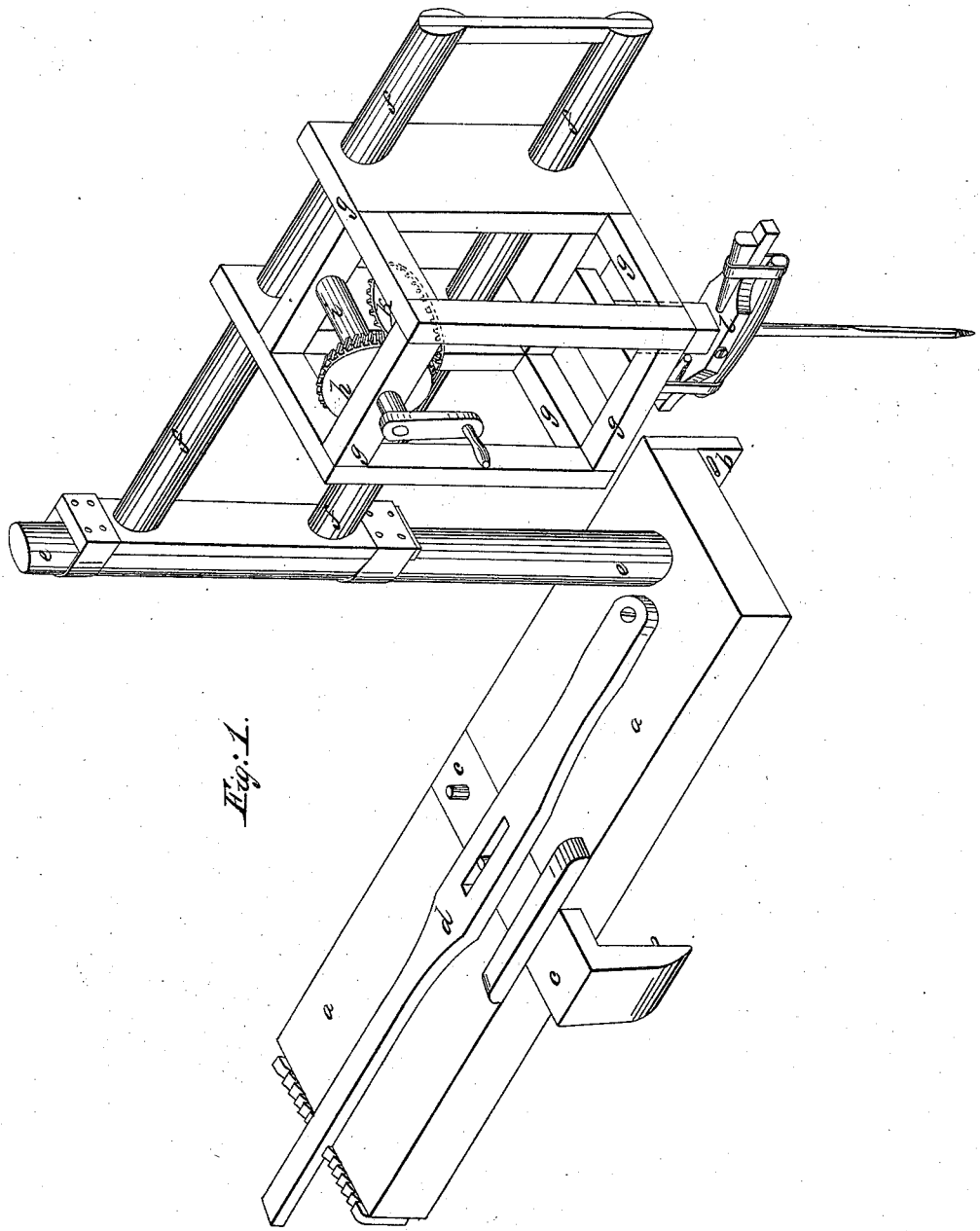

J. B. Coffin,
Boring Wood.
N° 4,085. Patented June 20, 1845.

UNITED STATES PATENT OFFICE.

J. B. COFFIN, OF MOHICANVILLE, OHIO.

BORING-MACHINE.

Specification of Letters Patent No. 4,085, dated June 20, 1845.

*To all whom it may concern:*

Be it known that I, J. B. COFFIN, of Mohicanville, in the county of Wayne and State of Ohio, have invented a new and Improved Apparatus for Boring, &c.: and I do hereby declare that the following is a full, clear, and exact description thereof, reference being had to the accompanying drawing, in which the figure is an isometrical view.

The nature of my improvements consist in the frame which supports the auger, and the manner of attaching the auger with a handle thereon to the machine. I construct the frame with a base consisting of an oblong plank $a$, having a ledge $b$, projecting down along one edge from the inner side of which spurs project; when this base is put onto a stick of timber to be mortised, the ledge comes down on one side, and the spurs stick into it; on the opposite side of the base a claw extends down from a horizontal bar $c$, that is let into a groove running across said base; this is moved in and out by a lever $d$, attached thereto, the fulcrum of which is near one end of the base and the handle projects over the other end; this lever is made to draw in the claw, to bind against the stick to which it is attached, and is there fastened by a rack as shown in the drawing, or in any other convenient way. At one end of the above described base $a$, is erected a round standard or post $e$, on which slide up and down two rings, to which horizontal arms $f$, are connected that serve to support a frame $g$, to which the gearing of the auger is attached these arms allow the frame to slide in and out, and they move up and down or in a circle horizontally, by which arrangement the auger can be placed in any position, within the length of the arms; in the frame $g$, there is a bevel wheel $h$, on a horizontal crank shaft $i$, that is driven by hand; this bevel wheel works into a horizontal one $k$, on an upright shaft, in the lower end of which there is a socket to receive boring tools in the usual way; I add to this end of the upright shaft a cross bar $l$, which is firmly affixed thereto, to this the handle of an auger can be clamped as shown in the drawing, or confined in any other way; this addition allows the use of any common auger, as well as those that are fitted to the socket by which common augers of any description can be applied without alteration.

What I claim as my invention, for which I desire to secure Letters Patent is—

The peculiar mode of combining the auger with a stationary base affixed to the timber to be bored as described so that a mortise can be bored in any direction within the compass of the machine without moving the base, by means of the frame in which the auger is situated sliding on ways to and from the standard attached to the base around which said ways revolve and upon which they are elevated and depressed the whole being constructed and arranged substantially in the manner and for the purpose above made known.

JAMES B. COFFIN.

Witnesses:
 J. J. GREENOUGH,
 L. CALDWELL.